UNITED STATES PATENT OFFICE.

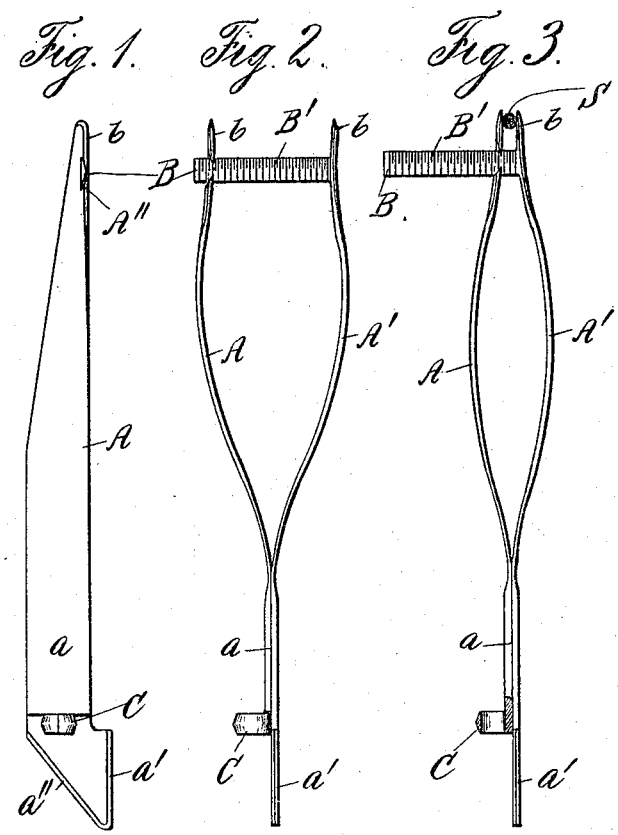

JOSEF PEJCHAR, OF BROOKLYN, NEW YORK.

TWEEZERS.

1,276,406.  Specification of Letters Patent.  Patented Aug. 20, 1918.

Application filed May 27, 1916. Serial No. 100,213.

*To all whom it may concern:*

Be it known that I, JOSEF PEJCHAR, a citizen of the United States, and resident of the borough of Brooklyn, in the county of Kings, city and State of New York, have invented certain new and useful Improvements in Tweezers, of which the following is a specification.

My invention relates to tweezers, particularly of the kind used by jewelers for the purpose of picking up and bringing to the desired place, precious stones or the like. The chief object of my present invention is to arrange a gage or scale adjacent to the seizing or holding portion of the instrument, so that the scale and the stone or other article held by the tweezers may be readily seen at one glance, and the size of such article ascertained without compelling the user to divert his eye from such stone. Another object of my invention is to combine with the tweezers, cutting and scraping, or implement-holding devices which will adapt the instrument to different uses, as will be fully set forth hereinafter.

Reference is to be had to the accompanying drawings, in which Figure 1 is a side elevation of tweezers embodying my improvements; Fig. 2 is a front view thereof, showing the tweezers open; and Fig. 3 is a front view showing the tweezers closed upon a stone or like article, a portion of the instrument being shown in section in this view. It will be understood that the drawings illustrate only an example of my invention, and that various modifications may be made without departing from the nature of my invention as set forth in the appended claims.

In the example illustrated, A, A' are two spaced and diverging members connected at one end, as indicated at *a*, but free to move together or apart in their main portions and particularly at their other ends. The separated portions of these members tend to spread apart, for which purpose they are made elastic, but preferably the extreme portions *b*, which form the holding portions of said members, are made rigid, for a purpose to be explained below. When closed upon the article to be grasped (such as a precious stone S), the inner faces of the holding portions *b* are parallel to each other, or nearly so. With one of the members, say A', is connected rigidly, preferably at the rigid holding portion *b* thereof, a transversely-extending measuring member or gage B having a suitable graduation or scale B', preferably along that edge which is nearest to the free ends of the holding portions *b*. This gage may be made integral with the member carrying it. The free end of the gage B is in contact with the other member (A), and is preferably guided thereby, as by making said member with a dovetail groove A'' and giving the gage B a corresponding (say, triangular) cross section, see Fig. 1. It will be observed that the gage arm B is flat and extends from the front face of the member A', also that the front face of said arm B is exposed where it crosses the arm A, so as to be readily visible. For this purpose, the guide A'' has projections which extend in front of the respective edges of the gage arm and prevent its forward movement while allowing it to slide transversely, and these projections are spaced from each other to expose the front face of the gage arm B where the latter crosses the arm A. These projections are preferably tapered as shown in Figs. 2 and 3 to form pointers indicating on the scale B'.

The end of the instrument at which the two members A, A' are connected, as at *a*, may be utilized for the location of additional tools or implements. Thus, on one side I have shown a round, sleeve-like portion C projecting at right angles from the member A, and preferably formed integral therewith, the two circular edges of which sleeve may be sharpened, and this sleeve may be used as a scraper or cutter, say for the purpose of making a groove in a piece of chalk, or for holding a lead-pencil or other article which may be fitted into the socket formed by the sleeve C. As shown, the other member, A', projects beyond the member A and the sleeve C at the end thereof, and this projecting end of the member A' may be made with one or two knife edges, say a straight longitudinal edge *a'* and an oblique or slanting edge *a''*, converging toward the extremity of the member A'.

When used as tweezers, the instrument is grasped in the usual way, with the connected portion *a* toward the person's wrist, and the two members A, A' pressed toward each other and against the stone S or other article (Fig. 3), by the user's thumb and forefinger. Inasmuch as the gage B is adjacent to the holding portions *b*, it will be obvious that the person using the instrument will be able, at one glance, to keep the stone or other article in view (so as to make sure it is being held properly) and at the same time ascertain, by means of the scale B' of the gage B, the dimensions of such article. If the scale were at such a distance from the holding portion b as to compel the user to shift his eye from one to the other, this would be open to the serious objection that when looking at the scale, he would never be quite sure that the holding portions of the instrument were in proper contact with the article to be measured. It is preferable to have the holding portions b rigid, and approximately parallel to each other, in order that the indications of the scale may not be made inaccurate by any flexing of the holding portions b between the gage B and the points of contact with the stone S or other article, and also in order that the indications may be equally accurate whether the article measured be small or large.

I claim as my invention:

1. Tweezers comprising two members elastic in their main portions and connected at one end, and movable toward and from each other at their other ends, said last-named ends being rigid, and a flat gage arm connected with one of said members rigidly at the front face thereof and extending therefrom transversely toward and beyond the other member, near the rigid ends of said members, the front face of said gage arm being exposed where it passes in front of said other member.

2. Tweezers comprising two substantially elastic members connected at one end and movable toward and from each other at their other ends, said last-named ends being substantially rigid, a gage arm secured to one of said members at its rigid end portion and extending transversely toward and beyond the other member, the latter being provided with a guide for said gage arm, said guide having projections which extend in front of the respective edges of said gage arm to prevent its forward movement, and are spaced from each other to expose the front face of the gage arm where the latter crosses said member.

In testimony whereof I have signed this specification.

JOSEF PEJCHAR.